UNITED STATES PATENT OFFICE.

EDWARD M. HAMILTON, OF BRISTOL, ENGLAND, ASSIGNOR TO CHARLES BUTTERS, OF OAKLAND, CALIFORNIA.

PROCESS OF TREATING ORES.

1,136,872. Specification of Letters Patent. Patented Apr. 20, 1915.

No Drawing. Application filed June 5, 1914. Serial No. 843,215.

*To all whom it may concern:*

Be it known that I, EDWARD M. HAMILTON, a subject of the King of Great Britain, and a resident of Bristol, England, have invented certain new and useful Improvements in Processes of Treating Ores, of which the following is a specification.

The object of this invention is to so treat slimes that they will be in good condition for the most efficient precipitation of the filtered solution by means of metals, such as aluminum. This result is obtained by so treating the slimes, preferably just before the filtration step, or the solution after filtration, that any substances which have been put into the slimes for the purpose of rendering them alkaline and settling the same, and which, if present in a substantial quantity in the filtered solution, would render the precipitated metal difficult to melt, are removed; or is so treated that this deleterious effect is counter-balanced. At the same time that these substances are removed a substance which is essential for efficient precipitation by aluminum is preferably simultaneously formed.

In the process of treating slimes, lime is extensively used for settling the slimes during their treatment in the mill. The amount of lime used on different ores varies to a considerable extent, because some slimes are decidedly more difficult to settle than others.

An alkali must usually be added to the ore in order to protect the cyanid and the amount of the alkali necessary for this purpose also varies with different ores, depending upon the acidity of the ores. Lime is usually used for this purpose, but in a process where the precipitation is by a metal which does not combine with the cyanid, such as aluminum, it is found that an excess of lime renders the precipitated metal difficult to reduce to bullion. Caustic soda is also used for this purpose in some instances but it is undesirable because of the great cost of the caustic soda as compared with lime. Apart from the question of cost, lime is considered superior, in most cases, as the protective alkali, but has a deleterious effect during the precipitating step. On the other hand, caustic soda has advantages over lime during the precipitation process, where metals which do not combine with cyanid, such as aluminum, are used for the precipitant. I have discovered a process by which lime can be used as the protective alkali and get all of the advantages which are secured by the use of caustic soda by subsequently so treating the pulp that all of the disadvantages coming from the use of lime in precipitation are destroyed.

When aluminum is used as the precipitating agent it is found that a caustic alkali, such as caustic soda, should be present in the solution, because the aluminum does not combine with the cyanid solution to replace the precious metals precipitated out. The reaction which takes place is probably as follows:—

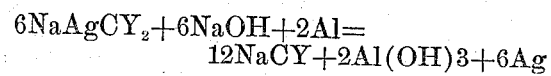

$6NaAgCY_2 + 6NaOH + 2Al = 12NaCY + 2Al(OH)_3 + 6Ag$ the aluminum hydroxid dissolving in the excess of caustic to form sodium aluminate as follows:

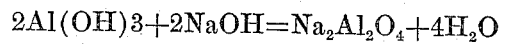

$2Al(OH)_3 + 2NaOH = Na_2Al_2O_4 + 4H_2O$

When aluminum was used as a precipitant it has been the practice heretofore to use the lime in as small quantities for settling and protection purposes as possible, because it was found that lime tends to form with the dissolved aluminum an insoluble calcium aluminate which collects in the precipitating press, giving a low-grade product, and one almost impossible to melt by the usual methods. I have overcome this difficulty by adding to the pulp, preferably just before the filtration process, a substance which will precipitate out substantially all the lime and at the same time form a caustic alkali which will remain in solution after the filtering process, and will therefore have the proper beneficial effect during the precipitating step by aluminum. By the use of this process, lime may be used to any degree desired to protect the cyanid and to settle the slimes. I have found that soda ash ($Na_2CO_3$) performs the function set forth above—that is, precipitates out the lime from the pulp or solution in the form of carbonate of lime, which is insoluble, and which remains in a fine state of division mixed with the ore and is filtered out with it during the filtration of the residue, and at the same time caustic soda is formed by the union of the soda ash with the lime, as follows:

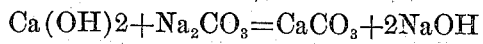

$Ca(OH)_2 + Na_2CO_3 = CaCO_3 + 2NaOH$

This solution, after being clarified according to the usual practice, is ready for the aluminum precipitation.

It will be seen therefore that by my process the usual practice of settling by adding lime may be employed, and preferably immediately before the pulp is filtered substantially all the alkaline earth compounds contained therein, which would be deleterious to the subsequent treatment of the precipitated metal, are removed, and a substance produced which is essential to the efficient precipitation by metals, such as aluminum.

It will also be apparent that the above process has many advantages, some of which are, that soda ash is easier to transport and handle than caustic soda; this method of making the caustic soda in the plant is cheaper than buying it and adding it direct to the solution, and it will admit of the use of lime in any amount as heretofore for neutralizing and settling purposes, which lime will be almost entirely eliminated and caustic soda substituted therefor before the solution goes to the precipitation press. There is another distinct advantage secured by this process in that the great percentage of the alkali which is consumed during the process is lime which is considerably cheaper than caustic soda. This lime is consumed in rendering the ores alkaline, and is so proportioned that at the time of filtering there is a comparatively small amount of free lime. It therefore takes a comparatively small amount of soda ash to precipitate the lime left in the pulp, while at the same time there is enough lime to combine with the soda ash and form the desired amount of caustic soda which has the beneficial action in the precipitating step. By my process I therefore utilize the beneficial qualities of the lime, and when the process gets to the point where the lime has no further beneficial effects, it is eliminated and caustic soda is formed at the point where the advantages, coming from the use of caustic soda, as compared with lime, begin.

As pointed out above the precipitation of the lime may be either just before it is filtered, or it may be precipitated from the filtered cyanid pregnant solution, but the former is preferable.

Having described my invention, what I claim as new and desire to secure by Letters Patent is:—

1. The process of treating slimes which consists in adding a substance thereto to render alkaline and settle the slimes and subsequently rendering said substance insoluble and precipitating the values.

2. The process of treating slimes which consists in adding a substance thereto to render alkaline and settle the slimes and subsequently precipitating out said substance and forming a substance beneficial to precipitation.

3. The process of treating slimes which consists in adding a substance thereto to render alkaline and settle the slimes and subsequently precipitating out said substance and forming a substance beneficial to precipitation by a metal which is not attacked by potassium cyanid.

4. The process of treating slimes which consists in adding a substance thereto to render alkaline and settle the slimes and subsequently precipitating out said substance and forming a substance beneficial to precipitation by aluminum.

5. The process of treating slimes which consists in adding lime thereto, precipitating out said lime and forming a caustic alkali in the slimes, filtering said slimes and precipitating the precious metal from the filtered solution by aluminum.

6. The process of treating slimes which consists in adding lime thereto, precipitating said lime and simultaneously forming a caustic alkali therein, filtering said slimes and precipitating the precious metal from the filtered solution by aluminum.

7. The process of treating slimes which consists in precipitating the lime therefrom and simultaneously forming a caustic alkali therein, filtering said slimes and precipitating the precious metal from the filtered solution by aluminum.

8. The process of treating slimes, which consists in adding sodium carbonate to the slimes to precipitate the lime therefrom and form caustic soda, filtering said slimes and precipitating the precious metal from the filtered solution by aluminum.

9. The process of treating slimes which consists in adding soda ash to the slimes, filtering the same and precipitating the precious metal from the filtered solution by aluminum.

10. The process of treating ore which consists in forming slimes in a solution rendered alkaline with lime, adding a solvent thereto to dissolve the precious metal, adding soda ash thereto to precipitate out the lime and form caustic soda, filtering said slimes and precipitating the precious metal from the filtered solution by aluminum.

In testimony whereof, I have signed my name to this specification, in the presence of two subscribing witnesses.

EDWARD M. HAMILTON.

Witnesses:
 G. W. SHEPHERD,
 EDWIN SEGER.